(No Model.)
W. R. COLE.
WICK TRIMMER.
No. 436,934. Patented Sept. 23, 1890.
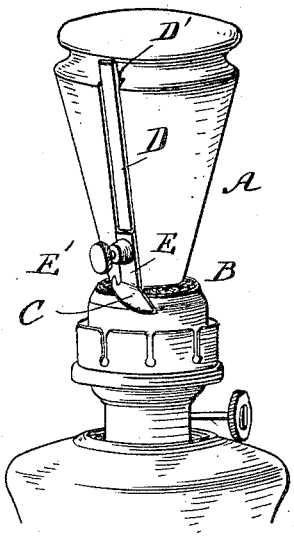
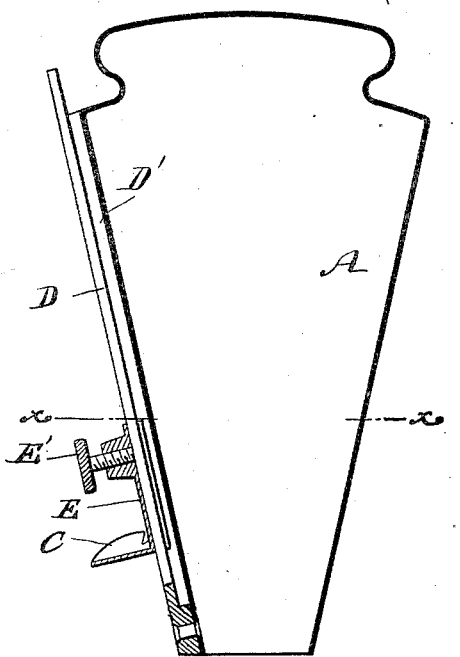
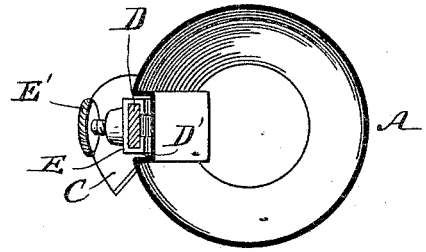
WITNESSES:
INVENTOR:
W. R. Cole
BY
Munn & Co.
ATTORNEYS

UNITED STATES PATENT OFFICE.

WILLIAM R. COLE, OF POTTSVILLE, PENNSYLVANIA.

WICK-TRIMMER.

SPECIFICATION forming part of Letters Patent No. 436,934, dated September 23, 1890.

Application filed December 17, 1889. Serial No. 334,028. (No model.)

*To all whom it may concern:*

Be it known that I, WILLIAM R. COLE, of Pottsville, in the county of Schuylkill and State of Pennsylvania, have invented a new and Improved Lamp-Wick Trimmer, of which the following is a full, clear, and exact description.

Reference is to be had to the accompanying drawings, forming a part of this specification, in which similar letters of reference indicate corresponding parts in all the figures.

Figure 1 is a perspective view illustrating the method of using my new lamp-wick trimmer. Fig. 2 is an enlarged sectional view of the trimmer, and Fig. 3 is a sectional plan view on the line $x\,x$ of Fig. 2.

The object of my invention is to provide a practical device for trimming circular lamp-wicks; and my invention consists, principally, of a suitable frame or stock provided with a lateral trimmer or knife, the stock being adapted to be rotated on or within the burner to carry the knife in uniform contact with the charred end of the wick, thus effecting a true and uniform trimming of the wick.

The invention also consists in making the stock conical and the knife adjustable to fit burners of different sizes.

A represents the frame or stock of the trimmer, which may be made of tin or other suitable material, and of a size to enter or rest upon a circular lamp-burner to furnish a bearing or point of rotation. The stock is by preference made conical to fit within the tube B, as illustrated in Fig. 1. To one side of the stock is attached the knife C, which, when the stock is placed on the burner, rests upon the wick, and when the stock is turned cuts or removes from the wick the burned or charred portion, and as the stock has a fixed point of rotation the knife effects this trimming of the wick in a perfectly uniform manner, which is difficult to do by hand, and which is necessary to a perfect light. The said knife C is vertically adjustable and may be attached in various ways. I prefer to attach it, by means of a sleeve E, to a rod or plate D held in a recess D' in one side of the frame or stock. The knife may be made integral with the said sleeve E or separate therefrom and attached by a screw or by soldering or brazing, and the sleeve is provided with a set-screw E' for fastening the sleeve and knife to the rod D at any desired position.

In use the stock A is placed on the lamp and the knife lowered on the wick and fastened by set-screw E', and then the stock is simply turned around, which will cause the knife to trim the wick in a perfectly uniform manner.

Having thus described my invention, what I claim as new, and desire to secure by Letters Patent, is—

1. The conical stock A, adapted to fit within the wick-tube, in combination with a laterally-extending and vertically-adjustable cutter or knife, substantially as described.

2. The conical stock A, recessed at D', and provided in said recess with a rod D, in combination with the knife C and sleeve E, adjustably attached to the rod D, substantially as described.

WILLIAM R. COLE.

Witnesses:
CHAS. H. WÖLTJEN,
S. M. ELSSLER.